Figure 1:
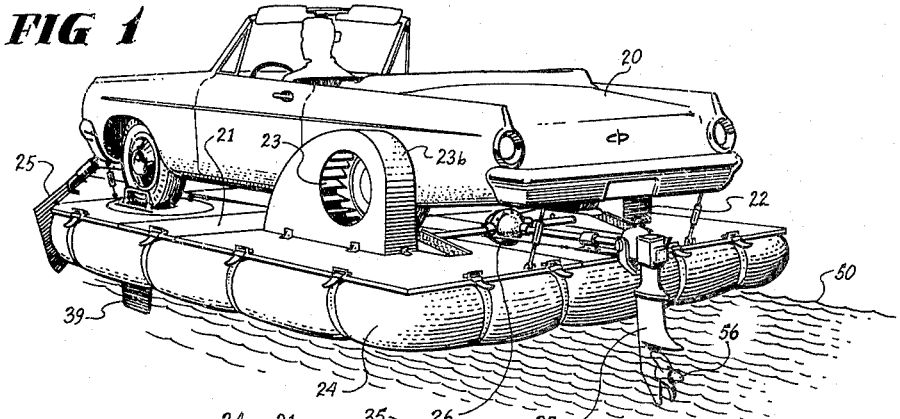

Oct. 12, 1965 P. J. MANTLE 3,211,124
AUTOMOBILE GEM KIT
Filed April 15, 1963 2 Sheets-Sheet 1

INVENTOR:
Peter J. Mantle

Oct. 12, 1965   P. J. MANTLE   3,211,124
AUTOMOBILE GEM KIT
Filed April 15, 1963   2 Sheets-Sheet 2
FIG 5
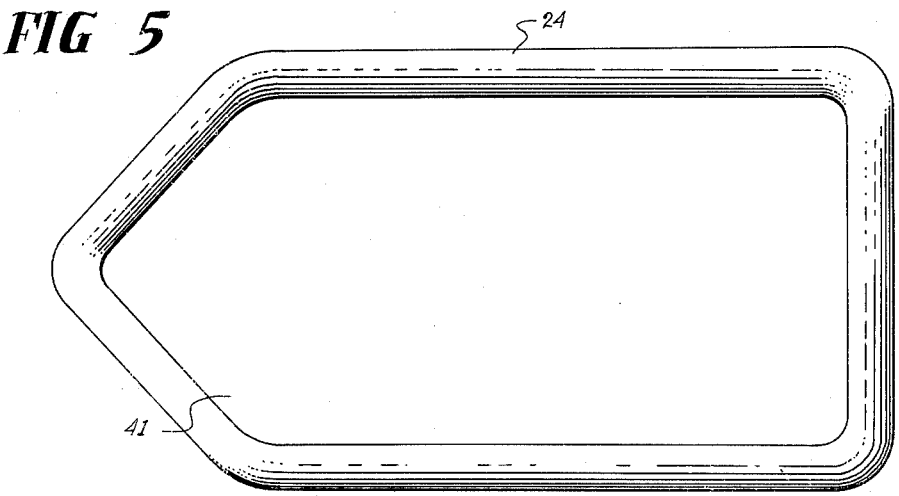
FIG 6
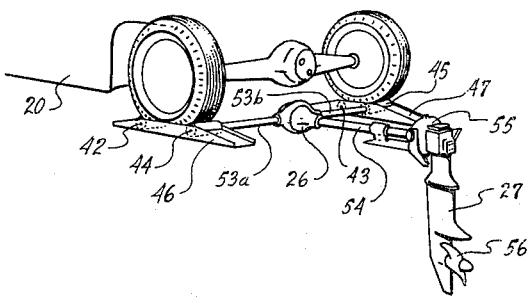
FIG 7    FIG 8
    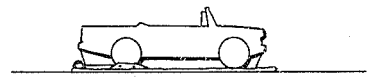
FIG 9    FIG 10
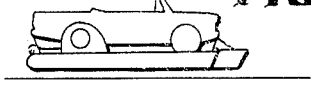    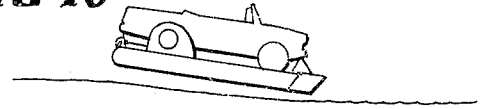
FIG 11    FIG 12
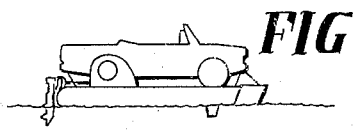    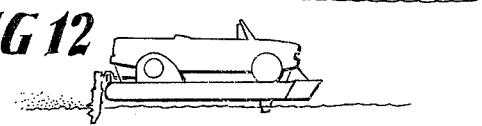
INVENTOR:
Peter J Mantle

United States Patent Office 3,211,124
Patented Oct. 12, 1965

3,211,124
AUTOMOBILE GEM KIT
Peter J. Mantle, Pasadena, Calif., assignor to Vehicle Research Corporation, Pasadena, Calif.
Filed Apr. 15, 1963, Ser. No. 273,073
5 Claims. (Cl. 115—.5)

This invention relates to the operation of a conventional automobile as a Ground Effect Machine (hereinafter referred to in combination as an automobile GEM). In particular, it relates to a kit for temporarily converting any conventional automobile, without structural change thereto and without additional power plants (unless the operator wishes to employ one or more outboard motors), into an automobile GEM.

Primary objects of the invention are: first, to extend the mobility of an automobile by giving it an over-water capability; second, to accomplish this with equipment light and compact enough to permit its transportation by the automobile itself; third, to use the controls of the automobile itself for operation of the vehicle in its automobile GEM role; fourth, to use the power of the automobile itself to generate the air cushion necessary for its automobile GEM role; fifth, to use the power of the automobile itself for propulsion of the automobile GEM.

Secondary objects of the invention are: first, to provide an automobile GEM kit for the purpose of converting an automobile to an automobile GEM, and second, so designed that it can be fitted to an automobile with the limited number and assortment of tools an automobile normally carries; and third, to provide an automobile GEM kit so composed that its basic parts can be supplemented by specifically designed parts to make the complete kit suitable for any automobile.

With these and other objects in view, the invention comprises the novel organization of principles and the arrangement of parts hereinafter described, and illustrated in the accompanying drawings. It is to be understood, however, that the aforementioned descriptions and drawings do not reduce the scope of the invention from that expressed by the claims hereunto appended.

Figure 2:
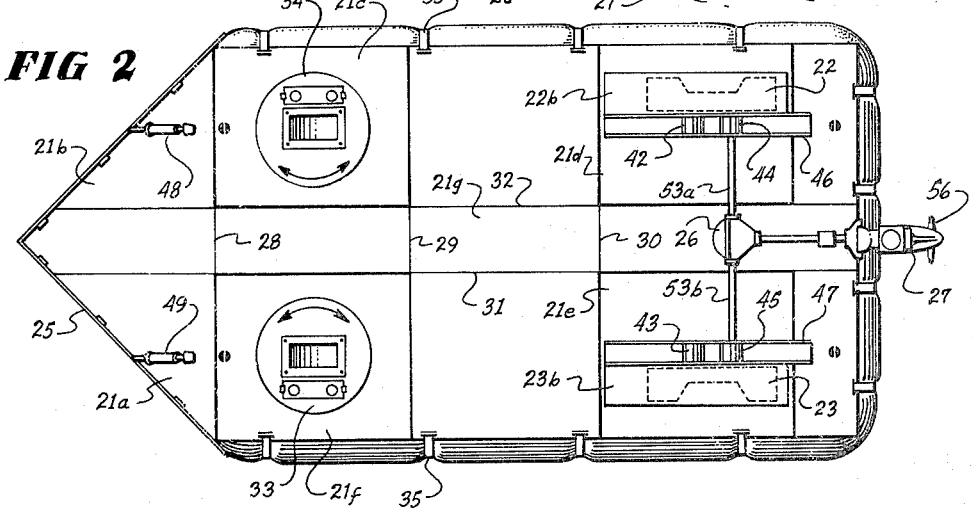
Figure 3:
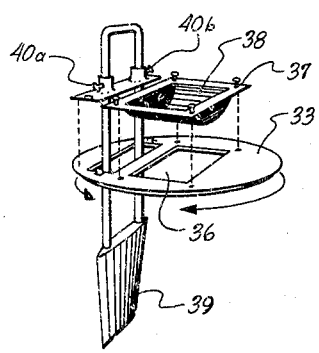
Figure 4:
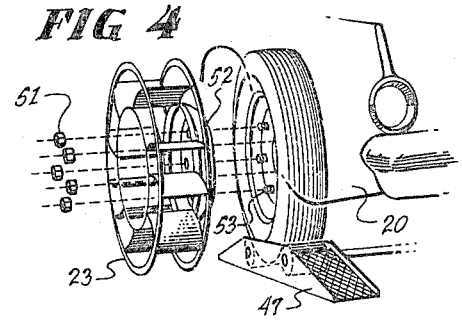

Of the accompanying drawings, forming part of this specification, in which like reference numerals designate like parts in the several views:

FIGURE 1 is a perspective view of an automobile equipped with the automobile GEM kit and translating over water, FIGURE 2 is a plan view of the sectionalized platform to which the automobile is secured during its automobile GEM role, FIGURE 3 is a perspective view of the left rotatable disc and the rudder which it controls, FIGURE 4 is a perspective view of the left fan, which is identical in design and function to the right fan, FIGURE 5 is plan view of the inflatable tube, FIGURE 6 is a perspective view of the water propeller and the mechanism through which the rear wheels of the automobile drive the water propeller, FIGURES 7, 8, 9, 10, 11, and 12 show, in sequence, the conversion of the automobile to an automobile GEM.

Referring now to the drawings and describing this invention in detail, an automobile 20, as shown in FIGURE 1 may be fitted with the basic automobile GEM kit (supplemented with specific parts appropriately sized for that model of automobile), the automobile GEM kit comprising the following main parts, the function of each to be described in detail: a sectionalized platform 21, fans 22 and 23, inflatable tube 24, wave deflector 25, conventional automobile differential gear 26, rudder 39, and conventional water propeller drive assembly 27 (the words "conventional" and "assembly" are used here to imply the gearing, shafting, and housing of a water propeller which is driven by an outboard motor of any type offered by the common market, or the gearing, shafting, and housing of a water propeller driven by the so-called "inboard/outboard" arrangement such as shown in FIGURE 1). Thus equipped with the main parts of the automobile GEM kit and the several other specific parts referred to previously and to be enumerated later, the automobile 20 may translate over water 50.

The sectionalized platform shown in FIGURE 2, referred to in its entirety as 21, comprises the bow sections 21a and 21b, the front right quarter section 21c, the rear right quarter section 21d, the rear left quarter section 21e, the front left quarter section 21f, and the center section 21g. The center section 21g, one of the specific appropriately sized parts referred to previously, is provided in different sizes to vary the overall size of the assembled platform according to the wheelbase of the automobile it is intended to accommodate. All other sections of the platform, previously enumerated as 21a, 21b, 21c, 21d, 21e, and 21f, are of standard dimensions. The center section 21g is hinged along the lines 28, 29, 30, 31, and 32, in an airtight fashion to be described, to facilitate ease of storage and transportation. The sectionalized platform 21, in its assembled condition, is secured to the inflatable tube 24 by a plurality of straps 35. The wave deflector 25, shown in FIGURES 1 and 2, is secured to the front bumper of the automobile 20 by the adjustable shock-absorbing clamps 48 and 49. During translation of the automobile GEM over water 50 (as shown in FIGURE 1) the inflatable tube 24 is protected from the impact loads of high waves by the wave deflector 25 which transmits the shock impacts of such waves to the frame or suitable hard point of the automobile 20.

The sectionalized platform rear right quarter section 21d and rear left quarter section 21e are equipped with fans 22 and 23 respectively, ducted to convey pressurized air through the platform 21 to the plenum chamber 41 shown in FIGURE 5. (The inflatable tube 24, and the sectionalized platform 21 are attached to each other by the straps 35, and they provide the walls and top of the plenum chamber 41.) The fans 22 and 23 are attached to the rear wheels of the automobile 20 by the nuts 51. The nuts 51, securing the rear wheel of the automobile 20 to the rear axle hub of the automobile 20, are removed and the fan 23 is fastened to the bolts 53 by replacing the nuts 51. The back plate of the fan 23 and the back plate of the fan 22 are specific, appropriately sized parts provided with holes drilled for the differing arrangements of bolts 53 on various makes of automobile 20. The housing 23b of the fan 23, shown in FIGURES 1 and 2, is of any lightweight but airtight material, its purpose being to direct the flow of air from the fan 23 through the rear left quarter section 21e of the sectionalized platform 21 and into the plenum chamber 41 shown in FIGURE 5. The housing of the fan 22 (not shown in any view) is identical in design and function.

The rear wheels of the automobile 20 rest on the rollers 42 and 44 and 43 and 45, mounted in the ramps 46 and 47 shown in FIGURE 6. The rollers 42 and 43 revolve freely when the rear wheels of the automobile 20 are in motion, and in conjunction with the rollers 44 and 45, whose purpose will be explained, they permit revolution of the rear wheels of the automobile 20 without corresponding forward or rearward motion of the automobile 20 itself. The rollers 44 and 45 are connected to the conventional automobile differential 26 by the shafts 53a and 53b. The differential 26 may be any "off-the-shelf" model of suitable design (its suitability being largely determined by its size), its sole function being to transfer the turning motion of the shafts 53a and 53b to the shaft 54. The shaft 54 enters the gearbox 55 which, in the conventional application of the inboard/outboard propeller drive 27, is coupled to a motor. The gear box 55 transfers the turning motion of the shaft 54 to the propeller 56. (The conventional inboard/outboard propeller drive assembly 27 may be an "off-the-shelf" product modified if necessary with a longer shaft to permit immersion of the propeller when the automobile GEM is operating above the surface of the water.) In the manner described the rear wheels of the automobile 20 thus impart the power of the engine of the automobile 20 to the fans 22 and 23, and also to the propeller drive assembly 27. It can be seen that unless a means of declutching the propeller drive assembly 27 is provided, there will be a constant relationship between the height of the automobile GEM above the water surface (50 of FIGURE 1) and the forward speed of the automobile GEM. While no such clutching arrangement has been shown in the accompanying drawings, the "off-the-shelf" inboard/outboard propeller drive assembly, as represented by 27 in FIGURES 1 and 2, is generally manufactured with an engage/disengage clutch, sometimes mechanical and sometimes electrical, and very frequently incorporating a reversing device as well. Because of the diversity of inboard/outboard propeller drives available, no declutching or reversing arrangements have been shown.

Steering of the automobile GEM is controlled by the normal steering wheel of the automobile 20, shown in FIGURE 1. The front quarter sections of the sectionalized platform 21f and 21e, shown in FIGURE 2, incorporate rotatable discs 33 and 34 which are identical in design and function. FIGURE 3 shows the disc 33 disassembled. An opening 36 in the disc 33 accommodates a removable plate 37. Whereas the discs 33 and 34 are of standard dimensions, the removable plate 37, one of the specifically sized parts, is provided in different versions for specific automobiles. That is to say, the curved trough 38 is varied in width and radius to accommodate the front wheel of any specific automobile. The disc 33 incorporates a rudder 39 which can be raised or, when the automobile GEM is supported on a cushion of air, lowered beyond the lower extremity of the inflatable rubber tube 24 and thus immersed in the water the automobile GEM is traversing. The rudder 39 can be secured in place by the adjustment screws 40a and 40b. The function of the discs 33 and 34 is to transfer the turning motion of the front wheel of the automobile 20, shown in FIGURE 1, to the rudder 39 and thus utilize the normal steering mechanism of the automobile 20 for directional control of the automobile GEM while translating over water.

Use of the automobile GEM kit may be described in the following sequence as illustrated by FIGURES 7, 8, 9, 10, 11, and 12. The basic kit for any automobile is supplemented by the following specifically sized items: the back plates of the two fans (with holes drilled to accommodate the bolts securing the rear wheels to that particular automobile), the curved troughs to accommodate the automobile's front wheels (the troughs of appropriate widths and radius), and the center section of the sectionalized platform (of such shape and dimension that when assembled with the quarter sections, the complete platform is of an appropriate size for the automobile it is intended to accommodate). The automobile GEM kit is taken out of its storage place in the automobile somewhere in the vicinity of the water. The inflatable tube is laid out on the ground and the sectionalized platform assembled above it. The drive mechanism is bolted to the center section of the platform and the shafts which convey power from the drive rollers beneath the rear wheels of the automobile are connected to those rollers. The inboard/outboard propeller drive assembly, which can be pivoted through 360 degrees, is kept clear of the ground during this operation. The rear hubcaps of the automobile are removed and the automobile is driven on the platform and secured in the proper position, that is the front wheels in the curved troughs of the rotatable discs, and the rear wheels on the rollers. Firm attachment of the automobile to the platform is accomplished by turnbuckles between the front bumper and the platform and between the rear bumper and the platform. The tube is now inflated and the rudders inserted through their slots in the rotatable discs. The wave deflector is secured to the front bumper of the automobile, and the fans are bolted to the rear wheels. The automobile engine is now started.

When the automobile drive is placed in gear the rear wheels revolve and cause a corresponding revolution of the fans attached to them. There is a resultant flow of air into the plenum chamber beneath the sectionalized platform. (The hinges of the platform, permitting the center section to be folded, and the joints between the various sections, become airtight when pressure is present in the plenum chamber and impinges on the rubber stripping adjacent to and overlapping every joint.) When there is sufficient pressure in the plenum chamber, the automobile GEM rises above the surface on the cushion of air. It may then be moved out over the water in this hovering mode.

When the automobile GEM is over water of sufficient depth, the rudders may be comlpetely lowered and secured in place by their adjusting screws, and the inboard/outboard propeller drive assembly may be rotated and the propeller immersed in the water. The electrical or mechanical clutch of the propeller is engaged so that the rear wheels of the automobile, as well as driving the fans, now cause the propeller to revolve and propel the automobile GEM. The relationship between the operating height and the speed of the automobile is a safety feature of the vehicle, in that an increase of height with an increase of speed reduces the frequency of wave impact for a given surface state.

Steering of the automobile GEM is accomplished by deflecting the front wheels of the automobile by normal use of the steering wheel. The corresponding movement of the rotatable discs moves the rudders beneath the automobile GEM.

Braking of the automobile GEM is accomplished by declutching the propeller and permitting its drag to slow the vehicle, or by reversing its action and using engine power to overcome the vehicle's forward momentum.

Having thus described my invention, what I claim as novel and desire to secure by Letters Patent of the United States is:

1. A GEM attachment type kit for automobiles comprising:

an inflatable tube which when inflated defines a plenum chamber;

a platform to be supported by said tube, for supporting an automobile, there being means to couple said platform to said tube;

a water propeller for driving said tube with platform;

a power fan disposed to deliver pressurized air into said plenum chamber underneath said platform for said tube when inflated to be lifted from said water surface without lifting said water propeller from the water surface; and means for coupling the rear wheels of an automobile when supported by said platform to said water propeller and to said power fan.

2. A GEM attachment type kit for automobiles comprising:

an inflatable tube which when inflated defines a plenum chamber;

a platform to be supported by said tube, for supporting an automobile, there being means to couple said platform to said tube;

water propeller means for driving said tube with platform;

means for driving said water propeller;

a power fan disposed to deliver pressurized air into said plenum chamber underneath said platform for said tube when inflated to be lifted from said water surface without lifting said water propeller from the water surface; and means for coupling the engine of an automobile when supported by said platform to said power fan.

3. A GEM attachment type kit for automobiles comprising:

an inflatable tube which when inflated defines a plenum chamber;

a platform to be supported by said tube, for supporting an automobile, there being means to couple said platform to said tube;

a water propeller for driving said tube with platform;

a power fan to deliver pressurized air into said plenum chamber underneath said platform;

rudder means coupled to said platform;

means for coupling the steering mechanism of an automobile when supported by said platform to said rudder means; and means for coupling the rear wheels of an automobile when supported by said platform to said water propeller and to said power fan.

4. A GEM attachment type kit for automobiles comprising:

an inflatable tube which when inflated defines a plenum chamber;

a platform to be supported by said tube, for supporting an automobile, there being means to couple said platform to said tube;

a water propeller mounted on said platform for selective immersion into water and retraction therefrom;

means for driving said water propeller;

a power fan disposed to deliver pressurized air into said plenum chamber underneath said platform for said tube when inflated to be lifted from said water surface without lifting said water propeller from the water surface; and means for coupling the rear wheels of an automobile when supported by said platform to said power fan.

5. A GEM attachment type kit for automobiles comprising:

an inflatable tube which when inflated defines a plenum chamber, said tube being shaped to exhibit an angled prow to absorb wave impact;

a platform to be supported by said tube, for supporting an automobile, there being means to couple said platform to said tube;

water propeller means for driving said tube with platform;

means for driving said water propeller;

a power fan disposed to deliver pressurized air into said plenum chamber underneath said platform for said tube when inflated to be lifted from said water surface without lifting said water propeller from the water surface; and means for coupling the rear wheels of an automobile when supported by said platform to said power fan.

References Cited by the Examiner

UNITED STATES PATENTS

| | | | |
|---|---|---|---|
| 1,484,109 | 2/24 | Beatty | 115—0.5 |
| 1,698,482 | 1/29 | Nicin | 180—7 |
| 2,456,086 | 12/48 | Schwall | 9—11 |
| 3,076,425 | 2/63 | Anderson | 115—0.5 |
| 3,077,174 | 2/63 | Cockerell | 114—67 |

OTHER REFERENCES

Design News, May 23, 1960, pages 6 and 7.

MILTON BUCHLER, *Primary Examiner.*

ANDREW H. FARRELL, *Examiner.*